United States Patent
Minneman et al.

(10) Patent No.: US 9,279,742 B1
(45) Date of Patent: Mar. 8, 2016

(54) SYSTEM AND METHOD OF MEASUREMENT FREQUENCY SHIFTING TO ISOLATE EXTERNAL ENVIRONMENTAL CONDITIONS FOR INTERFEROMETRIC DISPERSION MEASUREMENTS

(71) Applicant: INSIGHT PHOTONIC SOLUTIONS, INC., Lafayette, CO (US)

(72) Inventors: Michael Minneman, Lafayette, CO (US); Michael Crawford, Lafayette, CO (US); Jason Ensher, Lafayette, CO (US)

(73) Assignee: Insight Photonic Solutions, Inc., Lafayette, CO (US)

( * ) Notice: Subject to any disclaimer, the term of this patent is extended or adjusted under 35 U.S.C. 154(b) by 54 days.

(21) Appl. No.: 14/210,733

(22) Filed: Mar. 14, 2014

Related U.S. Application Data

(60) Provisional application No. 61/786,907, filed on Mar. 15, 2013.

(51) Int. Cl.
*G01B 9/02* (2006.01)
*G01M 11/00* (2006.01)

(52) U.S. Cl.
CPC .................................... *G01M 11/33* (2013.01)

(58) Field of Classification Search
CPC . G01M 11/33; G01M 11/331; G01M 11/335; G01M 11/338
See application file for complete search history.

(56) References Cited

U.S. PATENT DOCUMENTS

| | | | | |
|---|---|---|---|---|
| 5,491,548 A | * | 2/1996 | Bell et al. | 356/73.1 |
| 6,139,800 A | * | 10/2000 | Chandler | 422/82.08 |
| 2003/0174338 A1 | * | 9/2003 | Baney et al. | 356/477 |
| 2004/0165192 A1 | * | 8/2004 | Krause | 356/491 |
| 2005/0024645 A1 | * | 2/2005 | Dorrer | 356/450 |
| 2007/0013917 A1 | * | 1/2007 | Stubbe et al. | 356/511 |
| 2013/0271772 A1 | * | 10/2013 | Johnson et al. | 356/479 |

\* cited by examiner

*Primary Examiner* — Michael A Lyons
(74) *Attorney, Agent, or Firm* — Renner, Otto, Boisselle and Sklar, LLP

(57) ABSTRACT

A system and method including a semiconductor laser source configured to output radiation over a range of wavelengths at a prescribed rate to a device under test. The prescribed rate is sufficiently above environmental frequency bands. A detector is configured to detect output radiation from the device under test to obtain a detected signal associated with at least one physical property associated with the incident radiation over the range of wavelengths at the prescribed rate. The detected signal includes environmental signal and target signal from the device under test. A processor isolates the environmental signal from the detected signal; and processes the target signal to obtain dispersion information of the device under test. A system output is configured to output the dispersion information of the device under test.

16 Claims, 3 Drawing Sheets

SYSTEM AND METHOD OF MEASUREMENT FREQUENCY SHIFTING TO ISOLATE EXTERNAL ENVIRONMENTAL CONDITIONS FOR INTERFEROMETRIC DISPERSION MEASUREMENTS

RELATED APPLICATIONS

This application is a Non-Provisional of the U.S. Application No. 61/786,907 filed Mar. 15, 2013, which is hereby incorporated herein by reference in its entirety.

TECHNICAL FIELD

The present invention relates generally to an apparatus and a method for utilizing high speed sweeping of a tunable laser source to eliminate errors and increase repeatability in interferometric measurement systems.

BACKGROUND

It is well known that light pulses propagating along an optical fiber become broader and can eventually overlap one another. This phenomenon is known as dispersion. Interferometric optical dispersion measurement systems have been in existence for some time. In these conventional systems, acoustic or vibrational noise in the environment of the measurement hardware can have a significant impact on the variability of the measurement. This is because the frequencies of interest for the dispersion measurement are well within the 200 Hz to 200 KHz audio band. It is difficult to separate the signals generated by the vibration or acoustic perturbance from the desired dispersion-induced signal. With such conventional systems, it is not uncommon to need an isolated table, and for people near the test site to refrain from speaking loudly during a dispersion measurement test.

SUMMARY

Because dispersion measurement is not generally needed to be done repeatedly, nor must it be very fast (measurements today usually take a few seconds), there is no need to measure quickly. Moreover, there are measurement noise bandwidth issues that cause a user to prefer slower speeds. This tradeoff, though, is illusory; the limitation on repeatability of measurement can be affected to a much greater extent by the external conditions than the measurement noise bandwidth.

By introducing new tunable lasers, such as all-semiconductor akinetic lasers, which have the ability to sweep at very fast rates to support applications such as medical imaging, the above problems might be solved. By applying very fast measurement to the dispersion measurement process, the frequency of the desired measurement can be shifted out of the typical environmental frequency bands, and as a result the measurement can be made to be much less susceptible to these environmental conditions.

In other applications such as swept-wavelength test of telecommunications components, remote sensing and optical coherence tomography, there are many motivations to operate the laser not as a wavelength-switching device, but rather as a wavelength-sweeping device. A wavelength sweep, as used in this disclosure, refers to a continuous (or step-wise continuous) movement over time from one wavelength to another, preferably in a linear, monotonic fashion.

One aspect of the subject matter relates to a method for measuring dispersion in an interferometric measurement system, the method comprising: directing incident radiation over a range of wavelengths at a prescribed rate to a device under test, wherein the prescribed rate is sufficiently above environmental frequency bands; detecting output radiation from the device under test to obtain a detected signal associated with at least one physical property associated with the incident radiation over the range of wavelengths at the prescribed rate, wherein the detected signal includes environmental signal and target signal from the device under test; isolating the environmental signal from the detected signal; and processing the target signal to obtain dispersion information of the device under test.

Alternatively or additionally, the prescribed rate is above 1 kiloHertz.

Alternatively or additionally, the environmental frequency band is in an audio range of 1 to 20,000 Hertz.

Alternatively or additionally, the step of isolating the environmental signal from the detected signal includes converting the detected signal from time domain to frequency domain and filtering the detected signal to isolate the environmental signal from the detected signal in the frequency domain.

Alternatively or additionally, converting the detected signal from time domain to frequency domain includes performing a Fourier transform or a Laplace transform on the detected signal.

Alternatively or additionally, the prescribed rate is above 20,000 Hertz.

Alternatively or additionally, the step of isolating the environmental signal from the detected signal includes isolating signals below the prescribed rate.

Alternatively or additionally, the environmental signal is isolated from the detected signal using a Finite Impulse Response Filter or an Infinite Impulse Response Filter.

Another aspect of the subject matter relates to a dispersion measurement system, the system comprising: a semiconductor laser source configured to output radiation over a range of wavelengths at a prescribed rate to a device under test, wherein the semiconductor laser source is configured to receive an input signal to discretely change the radiation over the range of wavelengths at the prescribed rate and the prescribed rate is sufficiently above environmental frequency bands; a detector configured to detect output radiation from the device under test to obtain a detected signal associated with at least one physical property associated with the incident radiation over the range of wavelengths at the prescribed rate, wherein the detected signal includes environmental signal and target signal from the device under test; one or more processors coupled to the detector, wherein the one or more processors are configured to isolate the environmental signal from the detected signal; and process the target signal to obtain dispersion information of the device under test; and a system output configured to output the dispersion information of the device under test.

Alternatively or additionally, the prescribed rate is above 1 kiloHertz.

Alternatively or additionally, the environmental frequency band is in an audio range of 1 to 20,000 Hertz.

Alternatively or additionally, the step of isolating the environmental signal from the detected signal includes converting the detected signal from time domain to frequency domain and filtering the detected signal to isolate the environmental signal from the detected signal in the frequency domain.

Alternatively or additionally, converting the detected signal from time domain to frequency domain includes performing a Fourier transform or a Laplace transform on the detected signal.

Alternatively or additionally, the prescribed rate is above 20,000 Hertz.

Alternatively or additionally, the step of isolating the environmental signal from the detected signal includes isolating signals below the prescribed rate.

Alternatively or additionally, the one or more processors are further configured to isolate the environmental signal from the detected signal using a Finite Impulse Response Filter or an Infinite Impulse Response Filter.

A number of features are described herein with respect to embodiments of the invention; it will be appreciated that features described with respect to a given embodiment also may be employed in connection with other embodiments.

The invention includes the features described herein, including the description, the annexed drawings, and, if appended, the claims, which set forth in detail certain illustrative embodiments. These embodiments are indicative, however, of but a few of the various ways in which the principles of the invention may be employed.

DESCRIPTION

Figure 1:
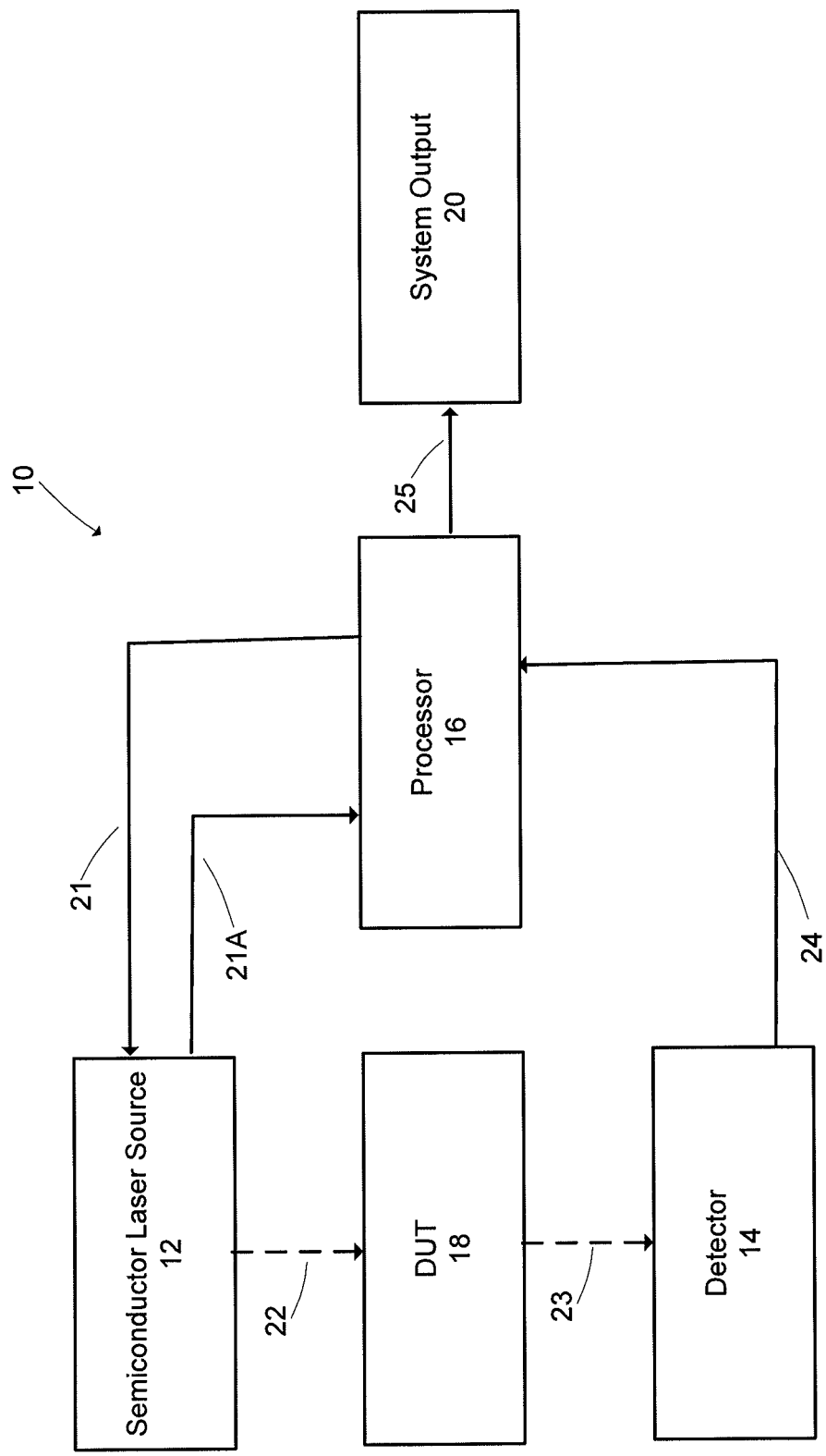
FIG. 1 illustrates an exemplary system in accordance with aspects of the present subject matter.

Referring to FIG. 1, a dispersion measurement system 10 (also referred to as dispersion testing system) is illustrated. The dispersion measurement system 10 includes a semiconductor laser source 12, a detector 14, a processor 16, and a system output 20. A target object, referred to as a device under test (DUT) 18, is placed in the dispersion measurement system 10, and in operation of the dispersion measurement system 10, the DUT 18 may be characterized. In characterizing the DUT 18, incident light 22 is provided to the DUT 18. Output light 23 from the DUT 15 is detected by the detector 14 and may be used to characterize the optical characteristics of the DUT 18, as will be described further below. A person of ordinary skill in the art will appreciate that the DUT 18 may be an object, a subject, a portion of a subject, etc.

During characterization of the DUT 18, the semiconductor laser source 12 is configured to receive an input signal 21 to discretely change the radiation over the range of wavelengths (e.g., from a start wavelength to a stop wavelength) at the prescribed rate. Typically, an environmental frequency band caused by the vibration or acoustic perturbance in the environment of the measurement hardware is in an audio range of 1 to 20,000 Hertz. A person having ordinary skill in the art should understand that the causes of environmental frequency band may include, but are not limited to, the vibration or acoustic perturbance in the environment of the measurement hardware, systemic noise, temperature, and humidity, etc. The prescribed rate needs to be sufficiently above the environmental frequency band so that the frequency of the desired measurement signal (also referred as target signal), which includes the dispersion information of DUT 18, can be shifted out of the typical environmental frequency bands. In one embodiment, the prescribed rate should be above 1 kiloHertz. In another embodiment, the prescribed rate should be above 20,000 Hertz.

An example of a semiconductor laser source 12 is a Semiconductor Monolithic Tunable Laser Source (SMTLS). A SMTLS 12 provides a laser beam (sometimes referred to as light but may be other radiation) 22 as incident radiation to the DUT 18. It will be appreciated that other types of semiconductor laser sources may be used and fall within the spirit and scope of the present disclosure. For convenience and brevity the radiation from the semiconductor laser source will be referred as a laser beam 22 or simply as a light or a light beam. The sweep of the SMTLS 12 may be very fast, thus allowing the detector 14 to be able to examine the power spectrum of light from a DUT 18 in a time frame that is in the second to millisecond (ms) range, i.e., Hertz to kilohertz range in frequency domain. Accordingly, the target signal from DUT 18 may separate from the environmental signal.

The term "swept", as used herein, means that the SMTLS 12 provides its light output at a number of wavelengths over a range of wavelengths. For example, the semiconductor laser source 12 provides radiation over a range of wavelengths using a discrete number of wavelength steps. That the wavelengths are "over" a range or "in" a range does not require that all wavelengths are used in the range, although use of all wavelengths may be possible, for example, if the dispersion measurement system 10 can use and/or produce and detect, all wavelengths in the range.

The wavelength range may comprise the visible range of light or a part of the visible range. The wavelength range may also contain wavelengths in the ultraviolet and/or infrared range. The wavelength range may be a combination, part, or entirety of the visible light range, ultraviolet range, infrared range, or any other suitable range of wavelengths. An exemplary wavelength range is from about 1502 nm to about 1604 nm. One of ordinary skill in the art will readily appreciate that the disclosure may be used with other wavelengths and wavelength ranges.

In the dispersion measurement system 10, the light 22 from the SMTLS 12 is incident on the DUT 18, and light 23 from the DUT 18, e.g., transmitted or reflected thereby, is sensed or detected by the detector 14. The detector 14 provides a detected signal 24 that is representative of the sensed or detected light 23 from the DUT 18. The detected signal 24 is associated with at least one physical property associated with the incident light 22 over the range of wavelengths. In this case, the detected signal 24 may include target signal from the DUT 18 and environmental signal generated by the vibration or acoustic perturbance in the environment of the measurement hardware or other error factors. The detected signal 24 may be provided to the processor 16 (or to another processor 16 or computational device), and/or to an amplification or other signal conditioning circuit (not shown).

The light 23 from the DUT 18 includes light that interacts with and does not interact with the DUT 18. Light that interacts with the DUT, e.g., may include light that is scattered, reflected, refracted, and/or is affected in any way by the DUT 18. Light that does not interact with the DUT 18, e.g., may include light that passes through the DUT 18 without interacting with the DUT 18.

A person of ordinary skill in the art will readily appreciate that the detector 14 is capable of measuring or quantifying light incident on the detector 14. The detector 14 may comprise, for example, an image sensor, CCD sensor, CMOS sensor, or any device capable of measuring or quantifying light incident on the detector.

In an exemplary dispersion measurement system 10, the processor 16 received detected signal 24 from the detector 14. As the above described, the detect signal 24 may include the target signal from the DUT 18 and the environmental signal generated by the vibration or acoustic perturbance in the environment of the measurement hardware or other error factors. The processor 16 isolates the environmental signal from the detected signal so that the target signal may be remained. The processor 16 then processes the target signal to obtain the dispersion information of the DUT 18. A person of ordinary skill in the art will readily appreciate that the method of processing the target signal into the dispersion information of the DUT has already been disclosed in the prior art.

The resulting amplified, conditioned or otherwise adjusted signal on line 25 is provided via the system output 20. The system output 20 may include the mentioned and/or other amplification, signal conditioning, computational, control, etc. circuitry or may include other circuitry for the purpose of obtaining useful system output information and/or signal for characterizing the DUT 18.

In an exemplary dispersion measurement system 10, the processor 16 coordinates operation of the SMTLS 12 with the signal on line 25 to the system output 20. Therefore, as the SMTLS 12 moves, scans, sweeps, etc. through the wavelengths of light it produces at a prescribed rate, the system output information is representative of characteristics of the DUT 18 as the DUT 18 receives incident light 22 at respective wavelengths at the prescribed rate. As one example, such coordination between the SMTLS 12 operation and the detector's output signal on line 24 may be achieved by a signal from the SMTLS 12 provided on line 21A to the processor 16, such that the processor 16 is "aware" of the wavelength, the rate, or other characteristic of the light produced by the SMTLS 12.

As another example, the processor 16 may provide a control signal on line 21 to the SMTLS 12 to "direct" or to instruct the SMTLS 12 to produce a given light output. Coordination between the SMTLS 12 and processor 16 also may be based on time, whereby a timing signal may be used to indicate that the SMTLS 12 is starting (or is elsewhere in) its scan cycle or period; and based on known characteristics of the SMTLS 12, the wavelength of its output at subsequent times can be accurately predicted. As another example, coordination between the SMTLS 12 and processor 16 also may be based on frequency, whereby a signal may be used to indicate that the SMTLS 12 is sweeping at a prescribed rate; and based on known characteristics of the SMTLS 12. The sweep frequency of its output at subsequent times would be expected. Other possibilities for such coordination also are possible.

Once the data has been acquired, the processor 16 may process the data by converting the detected signal from the time domain to the frequency domain by Fourier transform, for example. Then, the processor 16 filters the detected signal to remove environmental signal from the detected signal in the frequency domain.

Figure 2A:
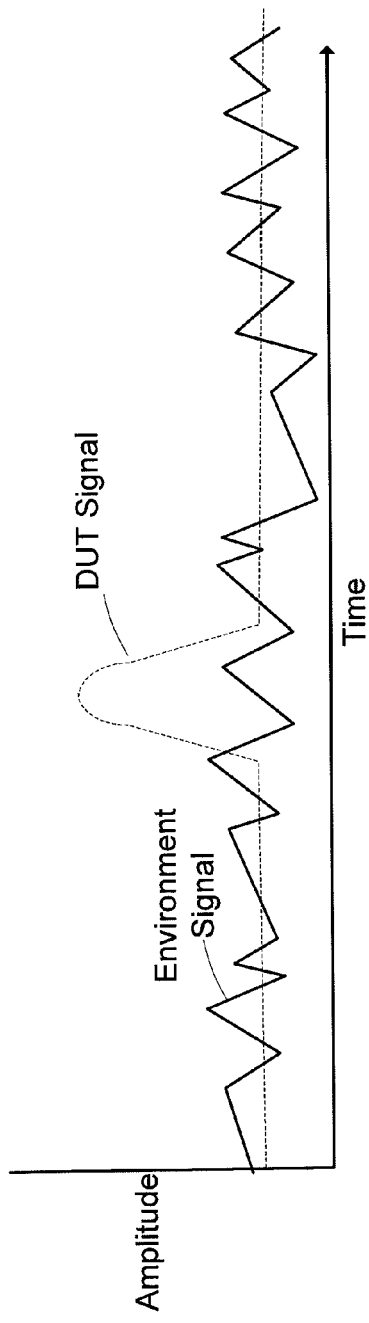
FIGS. 2A-2B are exemplary illustration of isolation of environmental signals in accordance with aspects of the present disclosure.
Figure 2B:
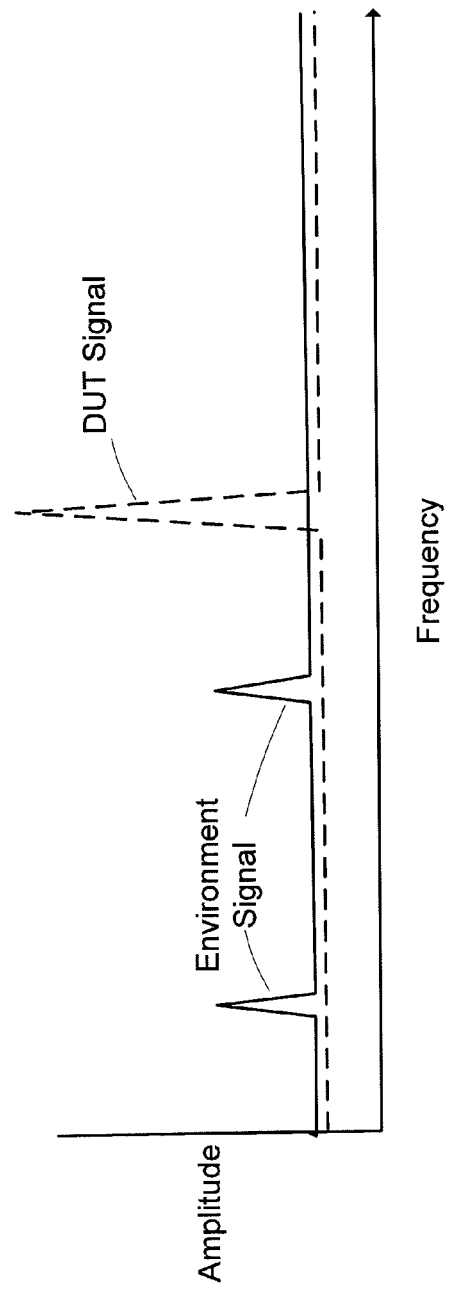

Referring to FIG. 2A exemplary data is illustrated having components formed by the environment signal and signal used to characterize the DUT 18. In FIG. 2A, the data is plotted over time and shows substantial overlap between the environment signal and the signal associated with the DUT 18. The processor 16 is configured to convert the data from the time domain to the frequency domain using any suitable technique (e.g., executing a fast Fourier transform algorithm). As shown in FIG. 2B, such a conversion results in isolating the environment signal and the signal associated with the DUT 18 from the detected signal. Once the signals are separated, a filtering or threshold technique may be used to characterize the environment signal.

A person of ordinary skill in the art will readily appreciate that a processor may be an ASIC, controller, computer, or any other type of device suitable for performing calculations and/or processing numbers. The functions processed by the processor 16 could be implemented by one or more processors. For example, one processor may implement the step of converting the detected signal from time domain to frequency domain. Another processor may implement the step of filtering the detected signal to remove environmental signal from the detected signal in the frequency domain. A third processor may process the target signal to obtain the dispersion information of the DUT. The above three processors are coupled together in order to implement all the necessary steps.

Figures 3, 4:
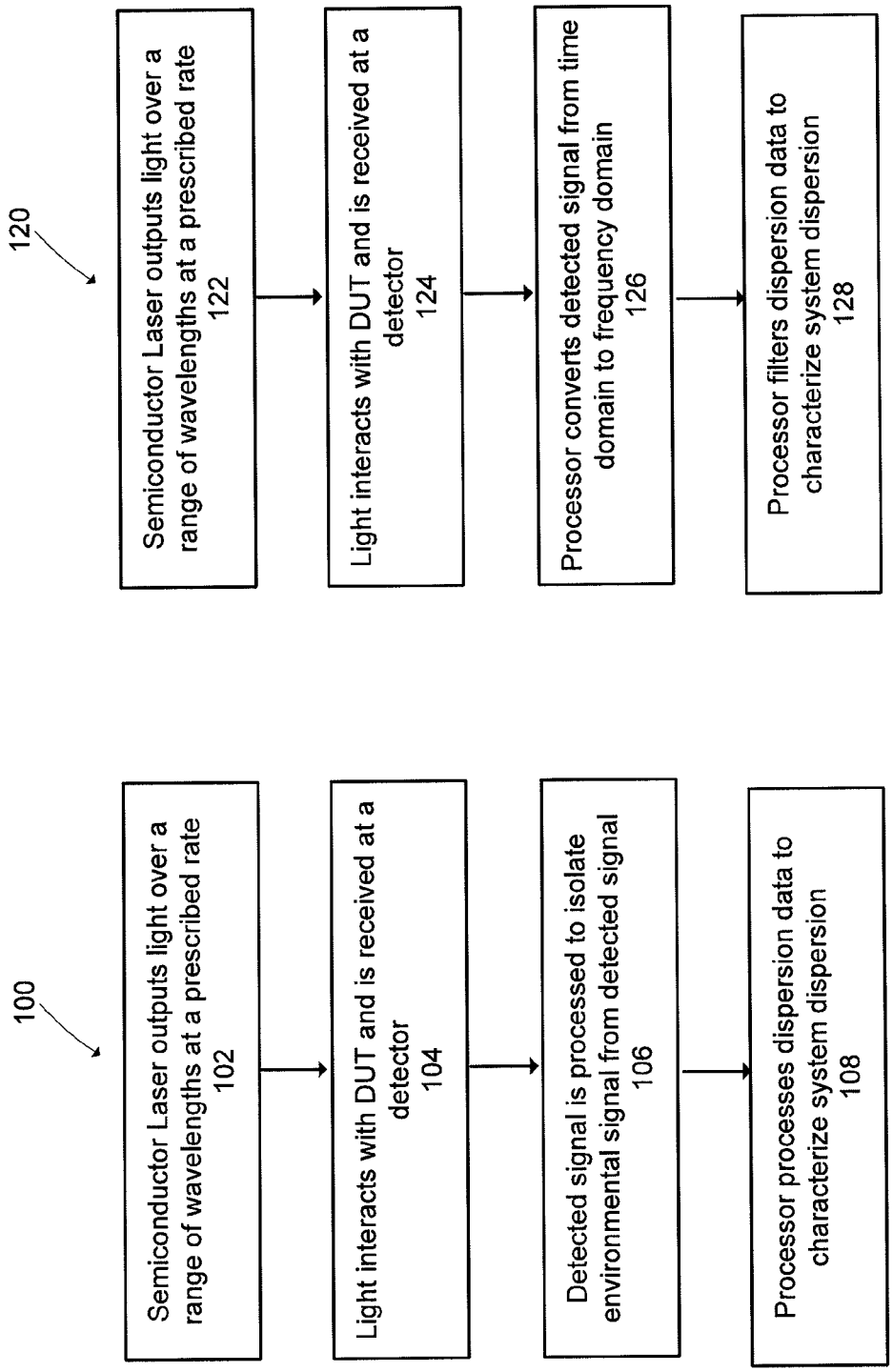
FIGS. 3-4 are exemplary methods in accordance with aspects of the present disclosure.

An exemplary method 100 for measuring dispersion in an interferometric measurement system is illustrated in FIG. 3. At block 102, a semiconductor laser source outputs lights over a range of wavelengths at a prescribed rate. The semiconductor laser source is configured to receive an input signal to discretely change the radiation over the range of wavelengths at the prescribed rate and the prescribed rate is sufficiently above environmental frequency bands. At block 104, the light interacts with and/or is transmitted by a DUT; and the light from the DUT is received by a detector. The detected signal is associated with at least one physical property associated with the radiation over the rage of wavelengths. At block 106, the detected signal from the detector is provided to a processor and the processor isolates the environmental signal from the detected signal. At block 108, the processor may characterize the dispersion data, which may be used to characterize dispersion in the system 10 and/or use the information to remove the dispersion data when testing a DUT, for example.

Another exemplary method 120 for measuring dispersion in an interferometric measurement system is illustrated in FIG. 4. At block 122, a semiconductor laser source outputs lights over a range of wavelengths at a prescribed rate. The semiconductor laser source is configured to receive an input signal to discretely change the radiation over the range of wavelengths at the prescribed rate and the prescribed rate is sufficiently above environmental frequency bands.

At block 124, the light interacts with and/or is transmitted by a DUT; and the light from the DUT is received by a detector. The detected signal is associated with at least one physical property associated with the radiation over the rage of wavelengths.

At block 126, the processor converts the detected signal from time domain to frequency domain.

At block 128, the processor filters the detected signal to isolate the environmental signal from the detected signal in the frequency domain.

A person having ordinary skill in the art will readily appreciate that any method of converting the detected signal from time domain to frequency domain may be used in accordance with the present disclosure. For example, methods may be implemented using Fourier transform, Laplace transform, or other similar calculation tools. As another example, filtering may be applied to the detected signal using a Finite Impulse Response (FIR) or Infinite Impulse Response (IIR) filters. Likewise, once the environmental signal is isolated from the detected signal, future tests may be run and the dispersion data may be removed from the testing results to more fully characterize the DUT, for example.

Illustrative embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

What is claimed is:

1. A method for measuring dispersion in an interferometric measurement system, the method comprising:
    directing incident radiation over a range of wavelengths at a prescribed rate to a device under test, wherein the prescribed rate is sufficiently above environmental frequency bands;
    detecting output radiation from the device under test to obtain a detected signal associated with at least one physical property associated with the incident radiation over the range of wavelengths at the prescribed rate, wherein the detected signal includes environmental signal and target signal from the device under test;
    isolating the environmental signal from the detected signal; and
    processing the target signal to obtain dispersion information of the device under test.

2. The method of claim 1, wherein the prescribed rate is above 1 kiloHertz.

3. The method of claim 1, wherein the environmental frequency band is in an audio range of 1 to 20,000 Hertz.

4. The method of claim 1, wherein the step of isolating the environmental signal from the detected signal includes:
    converting the detected signal from time domain to frequency domain; and
    filtering the detected signal to isolate the environmental signal from the detected signal in the frequency domain.

5. The method of claim 4, wherein converting the detected signal from time domain to frequency domain includes performing a Fourier transform or a Laplace transform on the detected signal.

6. The method of claim 1, wherein the prescribed rate is above 20,000 Hertz.

7. The method of claim 1, wherein the step of isolating the environmental signal from the detected signal includes isolating signals below the prescribed rate.

8. The method of claim 1, wherein the environmental signal is isolated from the detected signal using a Finite Impulse Response Filter or an Infinite Impulse Response Filter.

9. A dispersion measurement system, the system comprising:
    a semiconductor laser source configured to output radiation over a range of wavelengths at a prescribed rate to a device under test, wherein the semiconductor laser source is configured to receive an input signal to discretely change the radiation over the range of wavelengths at the prescribed rate and the prescribed rate is sufficiently above environmental frequency bands;
    a detector configured to detect output radiation from the device under test to obtain a detected signal associated with at least one physical property associated with the incident radiation over the range of wavelengths at the prescribed rate, wherein the detected signal includes environmental signal and target signal from the device under test;
    one or more processors coupled to the detector, wherein the one or more processors are configured to isolate the environmental signal from the detected signal; and process the target signal to obtain dispersion information of the device under test; and
    a system output configured to output the dispersion information of the device under test.

10. The system of claim 9, wherein the prescribed rate is above 1 kiloHertz.

11. The system of claim 9, wherein the environmental frequency band is in an audio range of 1 to 20,000 Hertz.

12. The system of claim 9, wherein isolating the environmental signal from the detected signal includes:
    converting the detected signal from time domain to frequency domain; and
    filtering the detected signal to isolate the environmental signal from the detected signal in the frequency domain.

13. The system of claim 12, wherein converting the detected signal from time domain to frequency domain includes performing a Fourier transform or a Laplace transform on the detected signal.

14. The system of claim 9, wherein the prescribed rate is above 20,000 Hertz.

15. The system of claim 9, wherein isolating the environmental signal from the detected signal includes isolating signals below the prescribed rate.

16. The system of claim 9, wherein the one or more processors are further configured to isolate the environmental signal from the detected signal using a Finite Impulse Response Filter or an Infinite Impulse Response Filter.

* * * * *